Feb. 4, 1969  E. H. FRIEDMANN ET AL  3,425,297
FLUID TORQUE TRANSMITTER
Filed Oct. 24, 1966

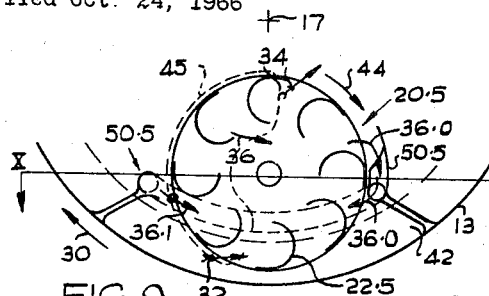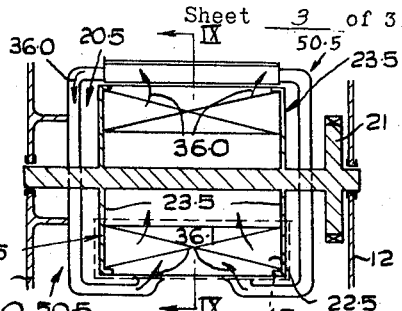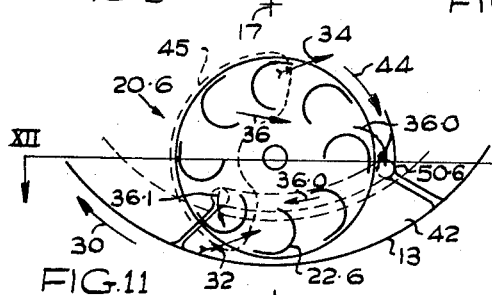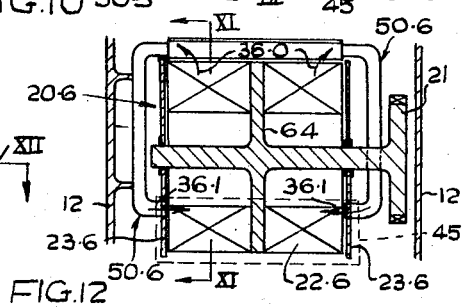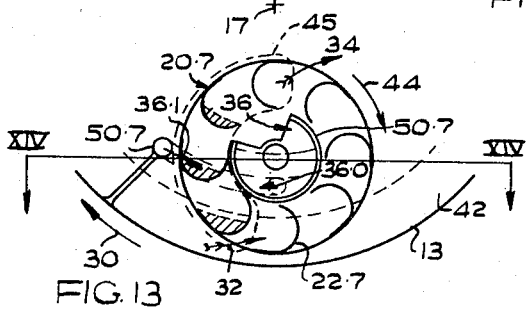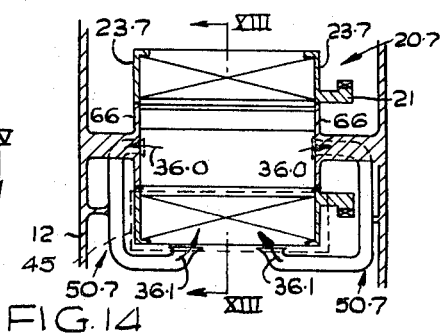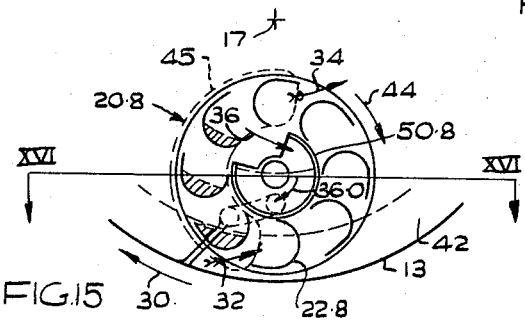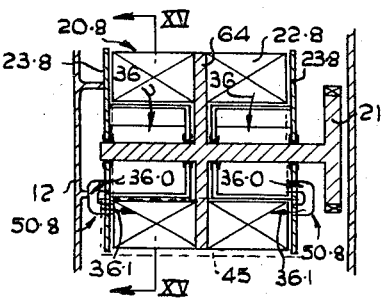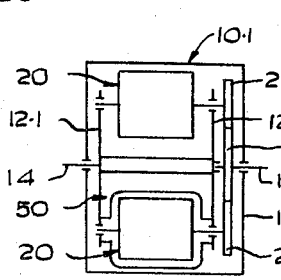

United States Patent Office 3,425,297
Patented Feb. 4, 1969

3,425,297
FLUID TORQUE TRANSMITTER
Eric Helmuth Friedmann, Kenilworth, Cape Town,
Cape Province; Hendrik Cancrinus, Rondebosch,
Cape Province; Timothy Richard Trembath,
Plumstead, Cape Town, Cape Province; and Philip
John Fourie, Tokai, Cape Province, Republic of
South Africa, assignors to Inpower Works (Proprietary) Limited
Filed Oct. 24, 1966, Ser. No. 589,079
Claims priority, application Republic of South Africa,
Nov. 1, 1965, 65/5,892
U.S. Cl. 74—752          13 Claims
Int. Cl. F16h 57/10, 3/74

---

ABSTRACT OF THE DISCLOSURE

This invention relates to a fluid torque transmitter adapted for the generation of torque by centrifugal force acting on an unbalanced mass of fluid entrapped in an entrapment zone offset from the axis of a planet wheel. The planet wheel is rotatably mounted on a carrier and is drivingly connected with a driven wheel coaxial with the carrier. It is adapted to reject entrapped fluid from the said zone when the planet wheel rotates about its axis relative to the carrier, and which includes diverting means for diverting such rejected fluid back into the zone.

---

This invention relates to a fluid torque transmitter.

According to the invention, there is provided a fluid torque transmitter adapted for the generation of torque by centrifugal force acting on an unbalanced mass of fluid entrapped in an entrapment zone offset from the axis of a planet wheel which is rotatably mounted on a carrier and which is drivingly connected with a driven wheel coaxial with the carrier, and being adapted to reject entrapped fluid from the said zone when the planet wheel rotates about its axis relative to the carrier, and which includes diverting means for diverting such rejected fluid back into the zone.

Further according to the invention, there is provided a fluid torque transmitter having a carrier adapted for being driven to rotate about its axis and at least one planet wheel rotatably mounted on the carrier; a driven wheel coaxial with the carrier and rotatable relative thereto and drivingly connected with the planet wheel and adapted for connection to a rotary power load; liquid-entrapping means which includes a liquid-entrapping wheel fast and coaxial with the planet wheel and having liquid retainers spaced circumferentially about the planet wheel axis: a reservoir in the form of a drum around the liquid-entrapping means and coaxial with the carrier and adapted to contain hydraulic fluid, the liquid-entrapping means being arranged when the planet wheel rotates about its axis relative to the carrier, to entrap an unbalanced mass of liquid on one side of the planet wheel axis in the liquid retainers in an entrapment zone from a peripheral layer set up in the drum due to the rotation of the carrier about its axis, and to displace such entrapped liquid inwardly towards the region about the axis of the carrier against the action of centrifugal force; the said liquid being rejected from the zone after such displacement, and diverting means arranged to divert such liquid which has been rejected from the zone, back into the zone, thereby augmenting the unbalanced mass of liquid in the zone for increasing the magnitude of the torque generated about the planet wheel axis.

The liquid retainers may be in the form of vanes which may be curved or straight, and may extend outwardly from a central boss or may be radially spaced from a central boss to provide a clearance space between the inner edges of the vanes and the boss. Alternatively, the boss may be dispensed with altogether. When the vanes are curved, they may define recesses, pockets, or buckets, and then they may be of substantially C-section.

Depending upon the shape of the vanes, and upon their arrangement, the recesses defined between adjacent vanes may have openings directed axially, radially inwardly, or radially outwardly, or directed in two or more of such directions. The diverting means is in its turn, may be arranged to receive liquid rejected from the liquid-entrapping wheel in a direction axially, radially outwardly, or radially inwardly, and to divert such rejected liquid into the same or another liquid-entrapping wheel, at a region spaced radially outwardly from the carrier axis relative to the point of rejection. The diverting means may be arranged to feed diverted liquid into such liquid-entrapping wheel in a direction axially, radially inwardly from the outside, or radially outwardly from the inside into the recesses.

If desired, axially spaced side walls may be provided at the ends of the vanes. These side walls may be fast with the vanes, or may be fast with the carrier and then they form shroud means. If desired, the shroud means may includes a circumferential wall extending between the side walls, in order to assist in the entrapment of liquid in recesses on one side of the planet wheel axis.

The driven wheel may be in the form of an externally toothed sun wheel, and the driving connection between the planet wheel and the sun wheel may be by direct meshing. The shroud means will then be provided on that side of the liquid-entrapping wheel which leads the planet wheel axis relative to the direction of rotation of the carrier about its axis. When the planet wheel meshes directly with the sun wheel, and when the vanes are curved and of substantially C-section, the openings of the vanes defined between their inner and outer lips or edges, are directed in such a direction about the planet wheel axis that at the outer periphery of the vanes away from the carrier axis, they are directed in the same direction as the direction of rotation of the carrier.

The diverting means may be fast with the carrier and may be in the form of a tube, channel, or deflector plate, adapted to guide or deflect rejected fluid into recesses disposed inwardly of the liquid layer relative ot the carrier axis.

The drum may be integral with the carrier, or it may be mounted rotatably relative to the carrier and the sun wheel, in which case it will extend around the carrier.

Yet further according to the invention, in a fluid torque transmitter in which torque is generated by an unbalanced mass of fluid offset from the axis of a planet wheel which is rotatably mounted on a carrier and which engages with a driven wheel coaxial with the carrier, and in which the unbalanced mass of fluid is maintained in unbalance by the entrapment of fluid in an entrapment zone, entrapment taking place from a peripheral layer of fluid when the planet wheel rotates about its axis relatively to the carrier, and by the rejection of fluid out of the zone at a region inwardly away from the peripheral layer, there is provided the method of augmenting the entrapped unbalanced mass by diverting fluid rejected from the zone and by feeding it back into the zone.

The invention will now be described by way of example with reference to the accompanying diagrammatic drawings.

In the drawings:

FIGURE 3 shows a detail at III—III in FIGURE 4 of a liquid-entrapping wheel with another type of diverting means;

Figure 3:
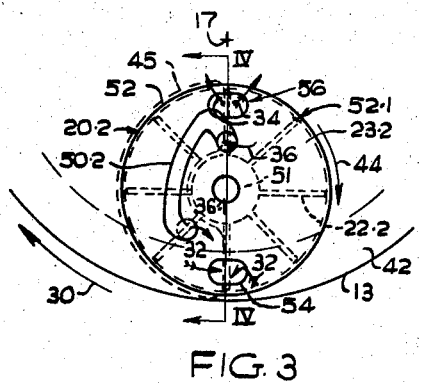
Figure 4:
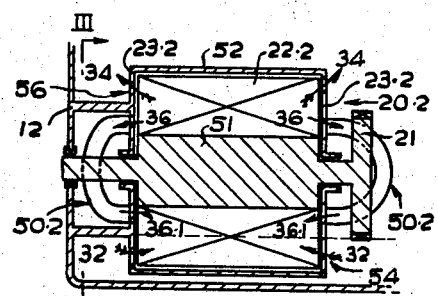
Figure 5:
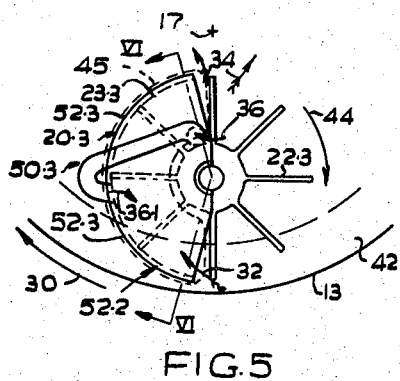
Figure 6:
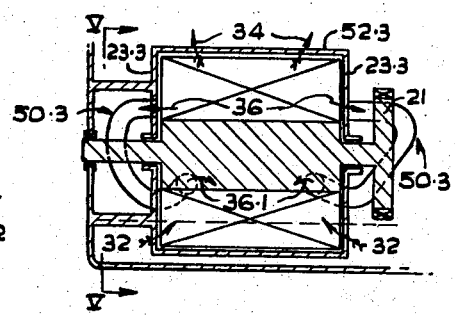
Figure 7:
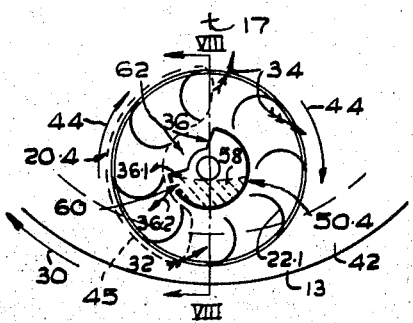
Figure 8:
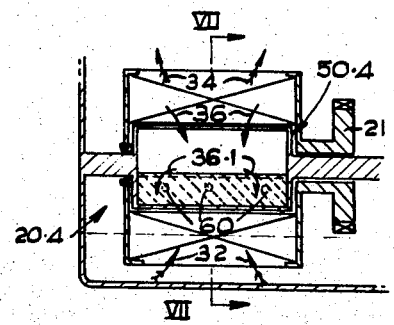

FIGURE 4 shows an axial section at IV—IV in FIGURE 3;

FIGURE 5 shows a detail at V—V in FIGURE 6 of a liquid-entrapping wheel with still another type of diverting means;

FIGURE 6 shows an axial section at VI—VI in FIGURE 5;

FIGURE 7 shows a detail at VII–VII in FIGURE 8 of a liquid-entrapping wheel with yet a further type of diverting means;

FIGURE 8 shows an axial section at VIII–VIII in FIGURE 7;

FIGURE 9 shows a detail at IX–IX in FIGURE 10 of a liquid-entrapping wheel with still another type of diverting means;

FIGURE 10 shows a section at X—X in FIGURE 9;

FIGURE 11 shows a detail at XI—XI in FIGURE 12 of a liquid-entrapping wheel with yet a further type of diverting means;

FIGURE 12 shows a section at XII—XII in FIGURE 11;

FIGURE 13 shows a detail at XIII—XIII in FIGURE 14 of a liquid-entrapping wheel with still a further type of diverting means;

FIGURE 14 shows a section at XIV—XIV in FIGURE 13;

FIGURE 15 shows a detail at XV—XV in FIGURE 16 of a liquid-entrapping wheel with another type of diverting means;

FIGURE 16 shows a section at XVI—XVI in FIGURE 15; and

FIGURE 17 shows an axial section of an embodiment having a drum independently rotatable of the carrier.

Referring to the drawings, reference numeral 10 refers to a coupling comprising a carrier 12 integral with a reservoir in the form of a drum 13, an input shaft 14 fast with the carrier 12, and a driven wheel in the form of an externally toothed sun wheel 16 coaxial with the carrier 12 and with the input shaft 14. The sun wheel 16 has an output shaft 18 fast and coaxial with it. The coupling further comprises liquid retainer wheels generally indicated by reference numeral 20 mounted to rotate about axes spaced away from the carrier axis. These liquid retainer wheels 20 are fast with two planet wheels 21 meshing with the sun wheel 16.

The liquid retainer wheels 20 may have vanes of different shapes. Thus the liquid retainer wheel 20.1 in FIGURES 1 and 2 has vanes 22.1, substantially of C-section, and extending axially the full length of the liquid retainer wheel 20.1 between axially spaced side walls 23.1 forming part of the liquid-entrapping wheel 20.1. Within the liquid-entrapping wheel 20.1 there is provided diverting means in the form of a deflector plate 50.1. This plate is fast with the carrier 12.

Figure 1:
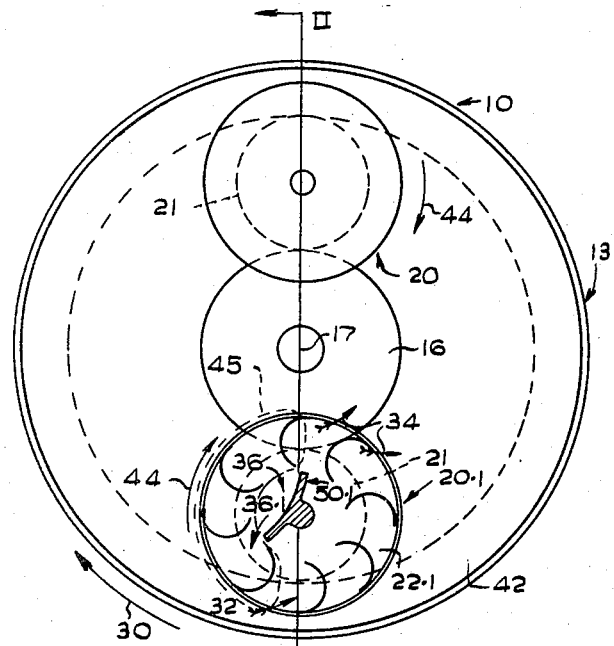
FIGURE 1 shows a cross-section at I—I of FIGURE 2, of a fluid coupling having drum and carrier integral, and with one type of diverting means.
Figure 2:
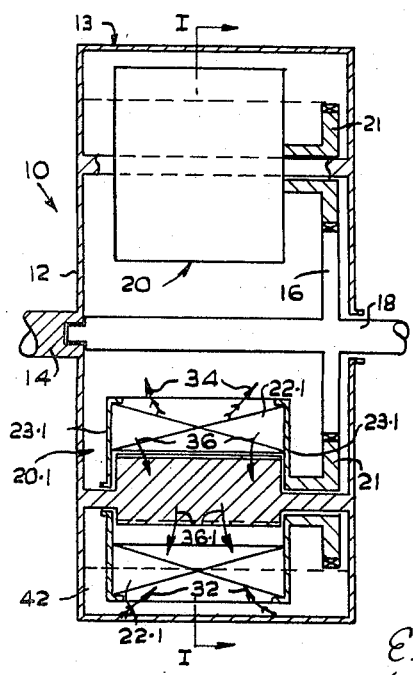
FIGURE 2 shows an axial section at II—II in FIGURE 1.

In operation, referring to FIGURES 1 and 2, when the carrier 12 is rotated about its axis in the direction of arrow 30, and when the sun wheel 16 is stationary or rotates at a speed less than the carrier, the vanes will intersect a layer of fluid 42 on the inner periphery of the drum 13, and liquid will enter the recesses between the vanes 22.1 in the direction of arrow 32, and will become entrapped therein. When the planet wheel 21 rotates about its axis in the direction of arrow 44 relative to the carrier 12, the vanes will carry the liquid inwardly towards the carrier axis. The liquid will therefore be entrapped in the recesses between the vanes on the leading side of the planet wheel axis relative to the direction of rotation of the carrier in an entrapment zone generally indicated by reference numeral 45. Due to rotation of the carrier about its axis, the entrapped liquid will be subjected to centrifugal force which will exercise a turning moment on the planet wheel 21 about its axis. This turning moment will be transmitted from the planet wheel 21 onto the sun wheel 16 to provide a torque which may be used for driving a load.

As the sun wheel speeds up, so the rate of rotation of the planet wheel about its axis relative to the carrier will slow down. When the sun wheel rotates at or near the same speed as the carrier, the planet wheel will be substantially stationary about its axis relative to the carrier.

While the sun wheels is stationary or is rotating only slowly, the planet wheel will be rotating at a fast rate relative to the carrier in the direction of arrow 44. Under the action of centrifugal force directed away from the planet wheel axis, liquid entrapped between the vanes will be rejected from the recesses defined between the vanes in the direction of arrows 34. As the rotation of the planet wheel about its axis relative to the carrier slows down, so the centrifugal force directed away from the planet wheel axis becomes less and less until rejection of fluid takes place under the action of centrifugal force resulting from rotation of the carrier about its axis. Such rejection will take place in a direction away from the carrier axis in the direction of arrows 36.

The liquid rejected from the zone 45 in the direction of arrows 36 is diverted by the deflector plate 50.1 in the direction of arrows 36.1 into recesses disposed radially outwardly from the carrier axis relative to these recesses from which the liquid was rejected. The rejected fluid thereby is diverted to augment the fluid entrapped in the recesses on the one side of the liquid-entrapping wheel eccentric to the liquid retainer wheel axis.

The diverting means may take various forms, depending upon the shape and form of the liquid retainer wheels. These are shown in the various drawings and will be more fully described hereafter.

Apart from the torque developed about the planet wheel axis as a result of centrifugal force, as above described, a further torque is also developed and which may be termed a drag or dynamic torque. When the vanes intersect the fluid layer 42 with a difference of speed, they will impinge against the liquid in the layer 42 and displace it about the planet wheel axis. This will exercise a drag on the vanes which is transmitted to the planet wheels and thence to the sun wheel. This drag or dynamic torque, resulting from the drag, is available to drive a load connected to the output shaft. When the sun wheel and output shaft are stationary, or when the difference between input and output speeds is relatively large, this drag or dynamic torque is significant. As the output shaft speeds up, so this drag or dynamic torque diminishes in value. The output torque available on the output shaft is the combination of these two component torques, the torque resulting from centrifugal force being one component, and the component resulting from the drag being the other component.

Referring now to FIGURES 3 and 4 of the drawings, a vane wheel 20.2 is shown having straight vanes 22.2 extending radially outwardly from a central boss 51. Axially spaced side walls 23.2 are provided, fast with the carrier 12, and engaging sealingly with the ends of the vanes 22.2. A circumferential wall 52 is provided fast with the side walls 23.2 and around the vane wheel 20.2. The side walls 23.2 and the circumferential wall 52, thereby form shroud means 52.1 around the vane wheel. The side walls 23.2 are provided with openings 54 on that side of the planet wheel axis remote from the carrier axis 17, to permit the entry of fluid into the recesses for entrapment between the adjacent vanes 22.2 in a direction of arrows 32 from fluid layer 42. The side walls are also provided with openings 56 on the near side of the planet wheel axis relative to the carrier axis 17, to permit the rejection of fluid from the recesses out of the zone 45 in the direction of arrows 34.

Diverting means in the form of a guide tube 50.2 is provided at each end of the liquid retainer wheel, the tube having an inlet opening near the boss 51, and disposed radially inwardly of the planet wheel axis relative to the carrier axis 17. The guide tube 50.2 has an outlet opening disposed radially outwardly of its inlet opening, and positioned such that it can discharge liquid into the recesses defined between adjacent vanes, at a region radially inwardly of the fluid layer 42. It will be noted that fluid is rejected axially from the liquid retainer wheel out of the zone 45, and again diverted into it axially.

Referring now to FIGURES 5 and 6 of the drawings, it will be noted that the arrangement is somewhat similar to that shown in FIGURES 3 and 4, except that the shroud means is not continuous around the liquid-retainer wheel, and hence it is not necessary to provide openings 54 and 56. The shroud means 52.2 comprising side walls 23.3 and circumferential wall 52.3, are arranged around the liquid retainer wheel on that side which leads the planet wheel axis relative to the direction of rotation of the carrier about its axis 17, as shown by arrow 30. Liquid enters recesses in the direction of arrow 32.

The diverting means in this arrangement comprises a guide tube 50.3 at each end of the liquid retainer wheel. It is arranged to receive liquid from the zone near the boss (as shown) inwardly of the planet wheel axis relative to the carrier axis 17, and is arranged to discharge radially inwardly in the direction of arrow 36.1 through the part-circumferential wall 52.3, into the recesses defined between adjacent vanes, and at a region radially inwardly of the layer 42 inside the drum 13. It will be noted that fluid enters the diverting means axially, and is discharged from it into the recesses in a direction radially inwardly towards the planet wheel axis. In this connection refer to arrows 36.1 in FIGURES 5 and 6.

Referring to FIGURES 7 and 8, it will be noted that the liquid retainer wheel 20.4 is substantially the same as liquid retainer wheel 20.1 shown in FIGURES 1 and 2. Liquid also enters the recesses in the direction of arrow 32. However, the diverting means is different in that it comprises a hollow channel 50.4 arranged axially within the liquid retainer wheel, and arranged to receive fluid rejected from the vanes 22.1 in the direction of arrow 36, to build up a fluid level 58. This fluid, when it has sufficiently built up, can spill over in the direction of arrow 36.1 into recesses which trail those from which the liquid has been rejected, i.e., back into the zone 45. Alternatively, or in addition thereto, an opening 60 may be provided to permit the discharge of liquid under pressure in the direction of arrow 36.2 into recesses which trail those from which liquid has been rejected. The discharge under pressure from the fluid 58 will take place under the action of centrifugal force resulting from the rotation of the carrier about its axis 17.

It will be noted that the diverting means 50.4 has an opening 62 to receive rejected liquid, and which is open in and leads the direction of rotation of the carrier about its axis.

Referring to FIGURES 9 and 10 of the drawings, a yet further arrangement is shown in which diverting means 50.5, fast with the carrier 12, is arranged to receive liquid rejected from the zone 45 radially outwardly in the direction of arrows 36.0 from the liquid retainer wheel 30.5, and to divert it in the directions of arrows 36.0 and thence radially inwardly in direction of arrow 36.1, into recesses disposed inwardly of the layer 42 relative to the carrier axis 17. It will be noted that the liquid retainer wheel 20.5 has vanes 22.5 of C-section spaced circumferentially between a pair of axially spaced side walls 23.5, and fast with them.

Referring to FIGURES 11 and 12 of the drawings, the diverting means 50.6 is arranged to divert liquid rejected radially outwardly in a direction 36.0 from the liquid retainer wheel 20.6 into recess in a direction axially, as indicated by arrow 36.1. The vanes 22.6 in this embodiment are of C-section and extended axially from a central wall 64. The side walls 23.6 are fast with the diverting means 50.6 and hence with the carrier 12.

FIGURES 13 and 14 show yet another type of construction which is a variation of the construction shown in FIGURES 7 and 8. In this construction the diverting means 50.7 is arranged to receive liquid rejected from the zone, in the direction of arrow 36, and is then arranged to divert such rejected liquid axially out of the liquid retainer wheel 20.7 as shown by arrows 36.0, and is then arranged to re-direct it into the liquid retainer wheel in a direction radially inwardly towards the planet wheel axis or liquid retainer wheel axis, in the direction of arrow 36.1.

It will be noted that the diverting means 50.7 has axially spaced end walls 66, which may line up with annular side walls 23.7, fast with the vanes 22.7 of the liquid retainer wheel 20.7. The end walls 66, being part of the liquid diverting means 50.7, are fast with the carrier 12.

FIGURES 15 and 16 shows a liquid retainer wheel 20.8 which is somewhat similar to the liquid retainer wheel 20.6 in FIGURE 12. The diverting means 50.8 is, however, a development of the diverting means 50.4 and 50.7. This diverting means 50.8 is arranged to receive liquid rejected in a direction 36 transversely to the planet wheel axis, and to redirect it axially out of the liquid retainer wheel in the direction of arrow 36.0 and thence axially in the direction of arrows 36.1 into the recesses between vanes 22.8. The diverting means 50.8 is fast with axially spaced side walls 23.8, and hence fast with the carrier 12.

Referring now to FIGURE 17 of the drawings, there is shown diagrammatically an axial section through an embodiment 10.1 having a drum 13.1 which is coaxial with and rotatable relative to the carrier 12.1. In other respects this embodiment is the same as described above, and has diverting means 50 fast with the carrier 12.1, where necessary. In other respects, this embodiment may be made to have the same structural features as that shown in the preceding drawings.

We claim:

1. A fluid torque transmitter adapted for the generation of torque by centrifugal force acting on an unbalanced mass of fluid, said torque transmitter comprising a carrier, a planet wheel which is rotatably mounted on said carier, a drive wheel coaxial with the carrier and drivingly connected with said planet wheel, said torque transmitter having an entrapment zone offset from the axis of said planet wheel for entrapping the unbalanced mass of liquid and being adapted to reject entrapped fluid from said zone when the planet wheel rotates about its axis relative to the carrier, and diverting means in said torque transmitter adapted to receive fluid rejected from the zone and divert it under the action of centrifugal force outwardly into a region of a zone further away from the carrier axis.

2. A fluid torque transmitter according to claim 1, in which the diverting means is arranged to receive liquid rejected from the zone in a direction substantially parallel to the planet wheel axis.

3. A fluid torque transmitter according to claim 1, in which the diverting means is arranged to receive liquid rejected from the zone in a radial outward direction away from the planet wheel axis.

4. A fluid torque transmitter according to claim 1, in which the diverting means is arranged to receive liquid rejected from the zone in a direction radially inwardly towards the planet wheel axis.

5. A fluid torque transmitter according to claim 1, in which the diverting means is arranged to feed diverted liquid into the zone in a direction parallel to the axis of the planet wheel.

6. A fluid torque transmittter according to claim 1, in which the diverting means is arranged to feed diverted liquid into the zone in a direction radially inwardly relative to the axis of the planet wheel.

7. A fluid torque transmitter according to claim 1, in which the diverting means is arranged to feed diverted liquid into the zone in a direction radially outwardly relative to the axis of the planet wheel.

8. A fluid torque transmitter according to claim 1, in which the diverting means is in the form of a conduit.

9. A fluid torque transmitter according to claim 1, in which the diverting means is in the form of a deflector plate.

10. A fluid torque transmitter according to claim 1, in which the diversion of rejected fluid back into the zone takes place radially outwardly of its rejection relative to the carrier axis.

11. A fluid torque transmitter according to claim 1, in which the drum is mounted rotatably relative to the carrier.

12. A fluid torque transmitter having a carrier adapted for being driven to rotate about its axis and at least one planet wheel rotatably mounted on the carrier; a driven wheel coaxial with the carrier and rotatable relative thereto and drivingly connected with the planet wheel and adapted for connection to a rotary power load; liquid-entrapping means which includes a liquid-entrapping wheel fast and coaxial with the planet wheel and having liquid retainers spaced circumferentially about the planet wheel axis; a reservoir in the form of a drum around the liquid-entrapping means and coaxial with the carrier and adapted to contain hydraulic fluid, the liquid-entrapping means being arranged when the planet wheel rotates about its axis relative to the carrier, to entrap an unbalanced mass of liquid on one side of the planet wheel axis in the liquid retainers in an entrapment zone from a peripheral layer set up in the drum due to the rotation of the carrier about its axis, and to displace such entrapped liquid inwardly towards the region about the axis of the carrier against the action of centrifugal force; the said liquid being rejected from the zone after such displacement, and diverting means in proximity to the liquid-entrapping wheel, the said diverting means being adapted to receive fluid rejected from the zone and to divert it under the action of centrifugal force outwardly into a region of the zone further away from the carrier axis, thereby augmenting the unbalanced mass of liquid in the zone for increasing the magnitude of the torque generated about the planet wheel axis.

13. A fluid torque transmitter according to claim 2, in which the drum is mounted rotatably relative to the carrier.

References Cited

UNITED STATES PATENTS

| | | | |
|---|---|---|---|
| 2,113,479 | 4/1938 | Scott-Iversen | 74—752 |
| 2,565,551 | 8/1951 | Dougherty | 74—774 X |
| 3,251,248 | 5/1966 | Cancrinus | 74—752 |
| 3,261,233 | 7/1966 | Cancrinus | 74—752 X |
| 3,334,528 | 8/1967 | Cancrinus | 74—752 |
| 3,351,168 | 11/1967 | Thorpe | 74—774 X |

ARTHUR T. McKEON, *Primary Examiner.*

U.S. Cl. X.R.

74—774